United States Patent [19]

Tasaki

[11] Patent Number: 5,192,191
[45] Date of Patent: Mar. 9, 1993

[54] PROPELLER VANE STRUCTURE FOR MARINE PROPULSION UNIT
[75] Inventor: Hiroshi Tasaki, Hamamatsu, Japan
[73] Assignee: Sanshin Kogyo Kabushiki Kaisha, Hamamatsu, Japan
[21] Appl. No.: 706,582
[22] Filed: May 28, 1991
[30] Foreign Application Priority Data
May 28, 1990 [JP] Japan .................................. 2-135347
[51] Int. Cl.⁵ ............................................. B64C 11/24
[52] U.S. Cl. .................................. 416/90 A; 416/93 A
[58] Field of Search ................ 416/90 R, 90 A, 93 R, 416/93 A, 244 B; 440/47, 38, 66
[56] References Cited
U.S. PATENT DOCUMENTS
1,190,755 7/1916 Hahn ................................. 416/90 A
3,173,492 3/1965 Dicesare ........................... 416/90 A
4,188,906 2/1980 Tachmindji et al. ............. 416/90 A
4,381,901 5/1983 Labudde ............................ 416/133
4,696,651 9/1987 Wagemann ...................... 416/90 A
4,778,419 10/1988 Bolle et al. ....................... 416/90 A FOREIGN PATENT DOCUMENTS
2403478 5/1979 France ............................... 416/90 A
0083693 6/1980 Japan ................................. 416/90 A
1-161899 11/1989 Japan .

Primary Examiner—Thomas E. Denion
Attorney, Agent, or Firm—Ernest A. Beutler

[57] ABSTRACT

A propeller vane or blade construction wherein cavitation is precluded at the base of the blade where they join the hub on their leading side by introducing a source of pressurized fluid in this area. The fluid may be pressurized either from the dynamic flow through the unit or by the static flow generated by the operation of the unit.

38 Claims, 4 Drawing Sheets

PROPELLER VANE STRUCTURE FOR MARINE PROPULSION UNIT

BACKGROUND FOR THE INVENTION

This invention relates to a propeller vane structure for a marine propulsion unit and more particularly to a propeller construction for fluid streams.

As is well known, a propeller functions by having blades that are disposed at an angle to the direction of fluid flow past them and which generate a fluid flow upon their rotation. Propellers of this type are used in a wide variety of applications including in so called water jet propulsion units wherein the impeller draws water through a water inlet and discharges it through a discharge nozzle for propelling an associated water craft. One problem particular to propeller constructions is the fact that, due to a wide variety of reasons, cavitation can result at the base of the propeller blade and where it is connected to the hub. This cavitation can be caused by the pressure variations attendant to the actual rotation of the blade and the differences in angle to the fluid being pumped or because of the way fluid is delivered to the blade from the fluid inlet. In either event, these pressure variations at the base of the blade can cause erosion of the material of the blade and, accordingly, obvious problems.

This problem is also prevalent in connection with stationery blades such as the straightening blades of a jet propulsion unit or stators. That is, the flow across these blades also tends to cause uneven pressures which can cause cavitation even around the base of the stationery blades.

It is, therefore, a principal object of this invention to provide an improved blade construction for a fluid flow system.

It is a further object of this invention to provide a blade construction for a fluid flow system wherein the base of the blade is supplied with pressurized fluid under all conditions to avoid cavitation.

It is a further object of this invention to provide a blade construction for a fluid system wherein cavitation is precluded at the area where the blade joins the hub.

SUMMARY OF THE INVENTION

This invention is adapted to be embodied in a blade construction for positioning in a stream of flowing fluid and comprised which blade comprises a hub and at least one blade connected at its base to the hub and extending outwardly therefrom into a stream of fluid. The blade has an upstream side and a downstream side. In accordance with the invention, means are provided for delivering a pressurized flow of fluid to the base of the leading side of the blade for precluding cavitation.

DETAILED DESCRIPTION OF THE PREFERRED EMBODIMENTS OF THE INVENTION

Figure 1:
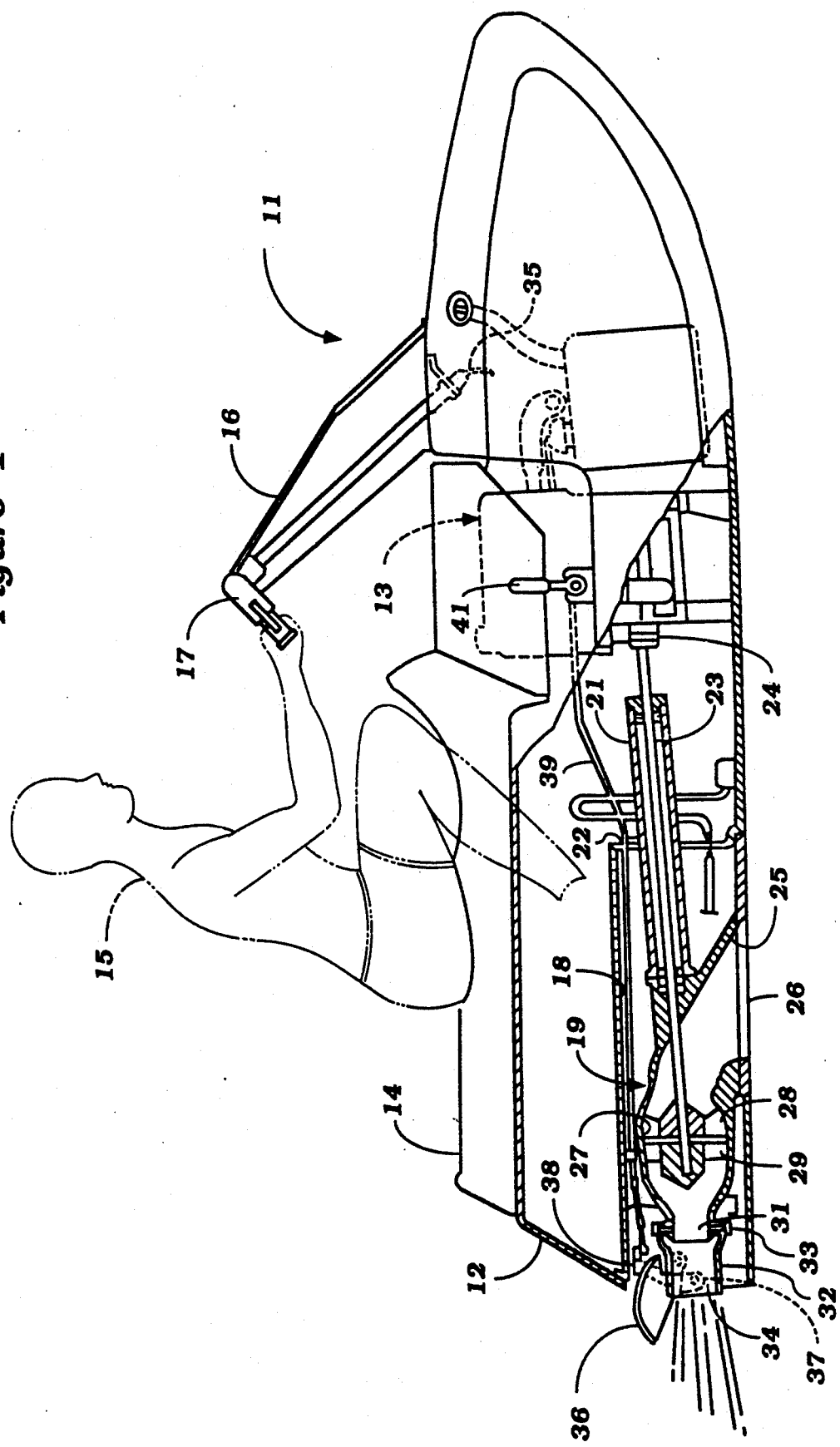
FIG. 1 is a side elevational view, with portions broken away, of a jet propelled water craft constructed in accordance with an embodiment of the invention.
Figure 2:
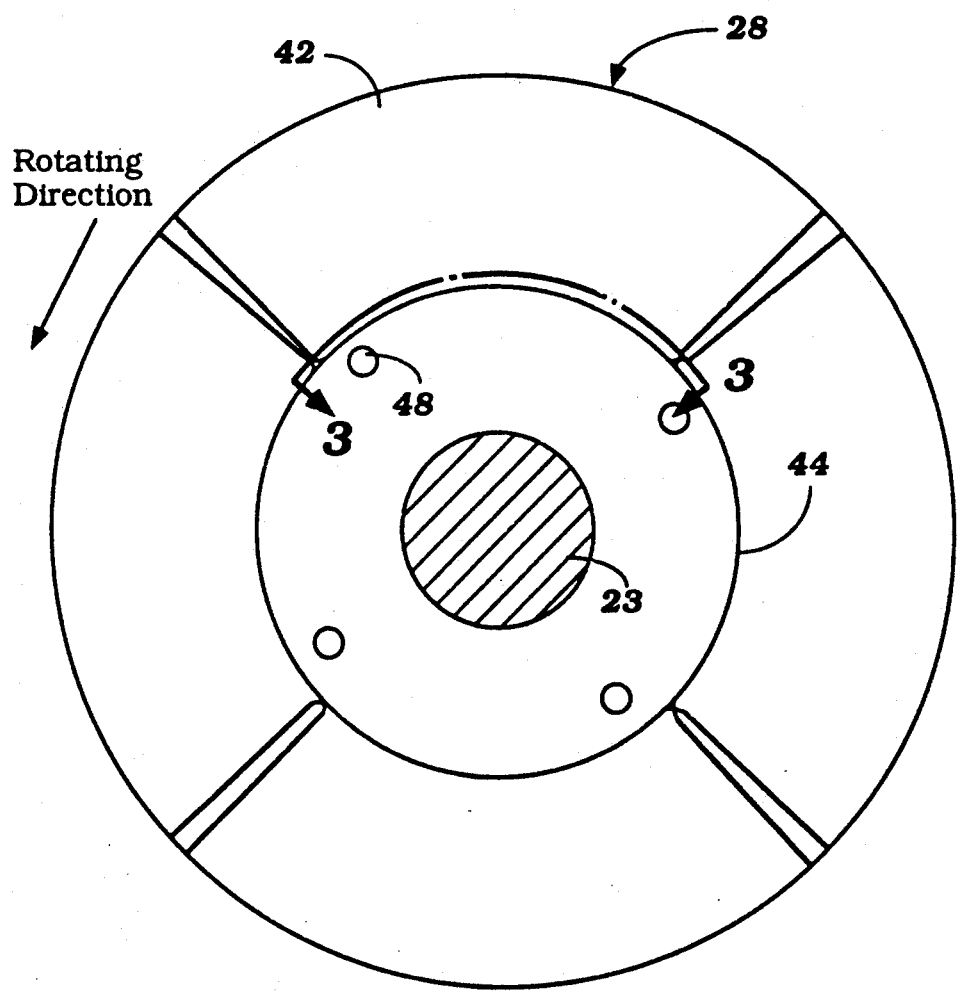
FIG. 2 is an enlarged rear elevational view of the impeller section of the jet propulsion unit.

Referring first in detail to FIG. 1, a small jet propelled water craft having a jet propulsion unit constructed in accordance with an embodiment of the invention is depicted and is identified generally by the reference numeral 11. Although the invention is described in conjunction with such a small water craft, it is to be understood that the invention may be utilized in conjunction with a variety of applications for vehicles or other devices powered by either jet propulsion units or other units embodying a propeller. The invention has particularly utility, however, in ducted impeller applications although the invention is not limited to such applications.

The water craft 11 has a hull, indicated generally by the reference numeral 12 having a forwardly positioned engine compartment in which an internal combustion engine, indicated generally by the reference numeral 13 is positioned. The engine 13 may be of any known type. A rider's seat 14 is provided rearwardly of the engine compartment and is adapted to accommodate one or more riders, shown in phantom at 15, seated in straddle fashion. A mast 16 is positioned forwardly of the seat 15 and carries a handlebar assembly 17 for steering and other control of the watercraft.

Beneath the seat 14, the watercraft hull 12 is provided with a tunnel like opening 18 in which a jet propulsion unit, indicated generally by the reference numeral 19 is positioned. The jet propulsion unit 19 has a forwardly extending drive tube 21 which extends through a bulkhead 22 formed at the front of the tunnel 19 and into the engine compartment. An impeller shaft 23 is journaled within the drive tube and is coupled by means of a coupling 24 to the output shaft of the engine 13.

The jet propulsion unit 19 has an inlet portion 25 having a downwardly facing inlet opening 26. Rearwardly of the inlet portion 25, the housing is provided with an impeller section 27 in which an impeller 28 is journaled in an appropriate manner. The impeller 28 is coupled suitably to the impeller shaft 23 so as to be driven by it.

Rearwardly of the impeller section 27 there are provided straightening vanes 29 which straighten the water circulated by the impeller 28 and deliver it to a discharge nozzle section 31. A steering nozzle 32 is pivotly supported at the exit of the discharge nozzle 31 by means of vertically extending pivot pins 33. The steering nozzle 32 has a discharge opening 34 through which water circulated by the impeller 28 is discharged to propel the watercraft in a well known manner. A linkage or cable system 35 interconnects the steering handle 17 to the steering nozzle 32 for steering it in a known manner.

A reversed thrust bucket 36 is pivotly supported on the steering nozzle 32 by means of a mounting bracket 37 and which mounting bracket has a lever arm 38 that is connected by a link 39 to a reverse shift lever 41 carried forwardly of the watercraft and at one side of the forward portion of the riders area. The reverse thrust bucket 36 may be pivoted from the forward position as shown in FIG. 1 to a reverse drive position wherein the water discharged from the steering nozzle opening 34 is directed forwardly so as to impart a rearward driving thrust to the watercraft 11.

The invention relates to the configuration of the blades of the impeller section 28 and straightening vanes 29 and the way in which cavitation is prevented at the base of these blades. For that reason, the forgoing description only sets the environment for the invention and, has been noted, the invention may be employed in a wide variety of other applications than those illustrated.

Figure 3:
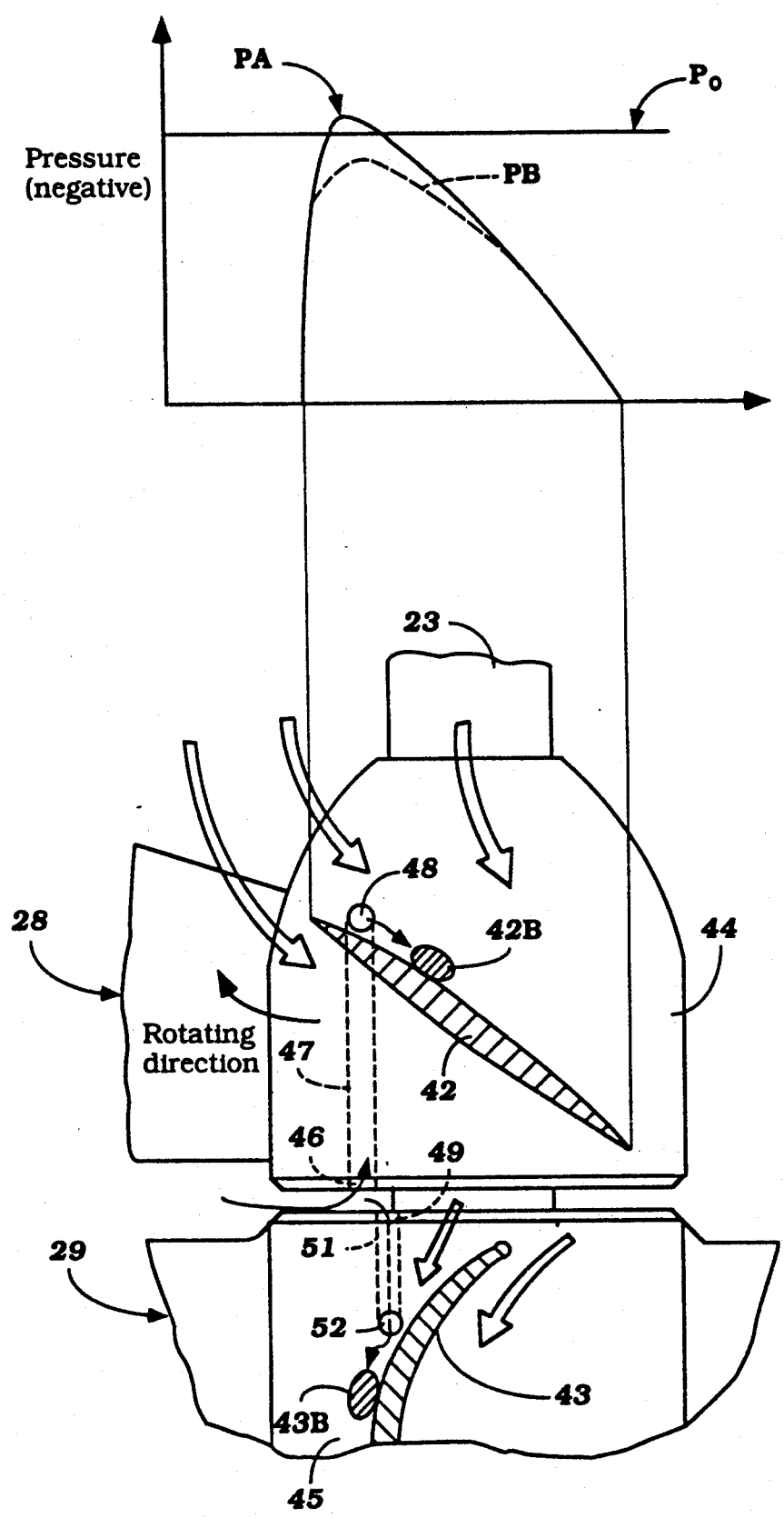
FIG. 3 is a top plan view of the blade construction and includes a graph showing the pressure across the base of the blades.

Referring now to FIG. 3, this figure is a top plan view of the impeller portion 28 and straightening portion 29 of the jet propulsion unit and also shows graphically the pressure variations of the various flow directing devices. It should be noted that the invention is employed not only with rotating propellers but also stationery vanes such as stators or straightening vanes, as illustrated in this specific embodiment. At least a portion of each vane is shown in cross section in this figure with the impeller vane being indicated, generally by the reference numeral 42 and the straightening vane being indicated generally by the reference numeral 43. The vanes 42 and 43 each are integrally connected at their base ends to respective hubs 44 and 45. The hub 44 of the impeller 28 is a fixed for rotation with the impeller shaft 23, as aforenoted. The hub 45 of the straightening vane 29 is fixed suitably to the jet propulsion unit outer housing.

The graphical view shown in FIG. 3 indicates the pressure at a point 42-B of the impeller vane 42 or at a point 43-B of the straightening vane 43. As may be seen, the pressure varies as the device rotates and at times this pressure $P_A$ can be less than the pressure $P_o$ at which cavitation occurs. In accordance with the invention, means are provided for delivering high pressure water to the base of the leading side of both the rotating vane 42 and the stationery straightening vane 43 so as to always provide a pressure that is greater than the cavitation pressure ($P_o$) and hence will avoid erosion of the blades where they join the hub and thus provide a high strength, long life assembly.

In this embodiment, the high pressure water source is taken as a high pressure static pressure from a point downstream of the impeller section 28 and upstream from the straightening vane portion 29. This point is chosen in this embodiment because it is in essence a point of highest water pressure. As may be seen, the impeller 28 is provided with a high pressure inlet opening 46 that is formed at the rear of its hub portion and which communicates with a delivery passage 47 that extends axially through the hub portion and which terminates at a discharge opening 48 disposed at the base of each base 42. As a result, high pressure water will be introduced that raises the water pressure at the base of the blades 42 above the cavitation pressure as shown by the curves $P_B$ in FIG. 3.

In a similar manner, the hub of the straightening vane portion 29 is provided with a high pressure inlet opening 49 that communicates with a delivery passage 51 that terminates in an outlet opening 52 positioned toward the leading edge of the straightening vane 43 and specifically an area where it reaches where the curved entry portion meets the straightening portion. Again, this construction will avoid cavitation.

Figure 5:
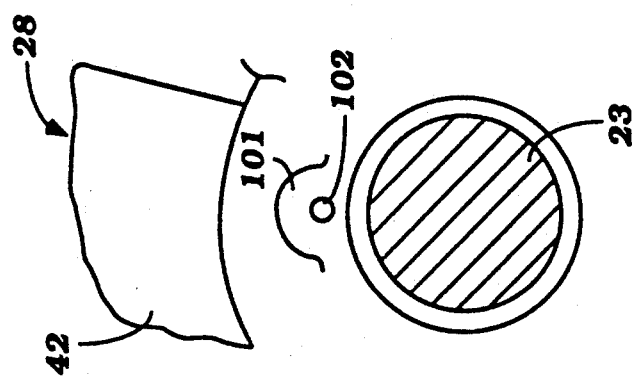
FIG. 5 is a cross sectional view taken along the line 5—5 of FIG. 4.
Figure 4:
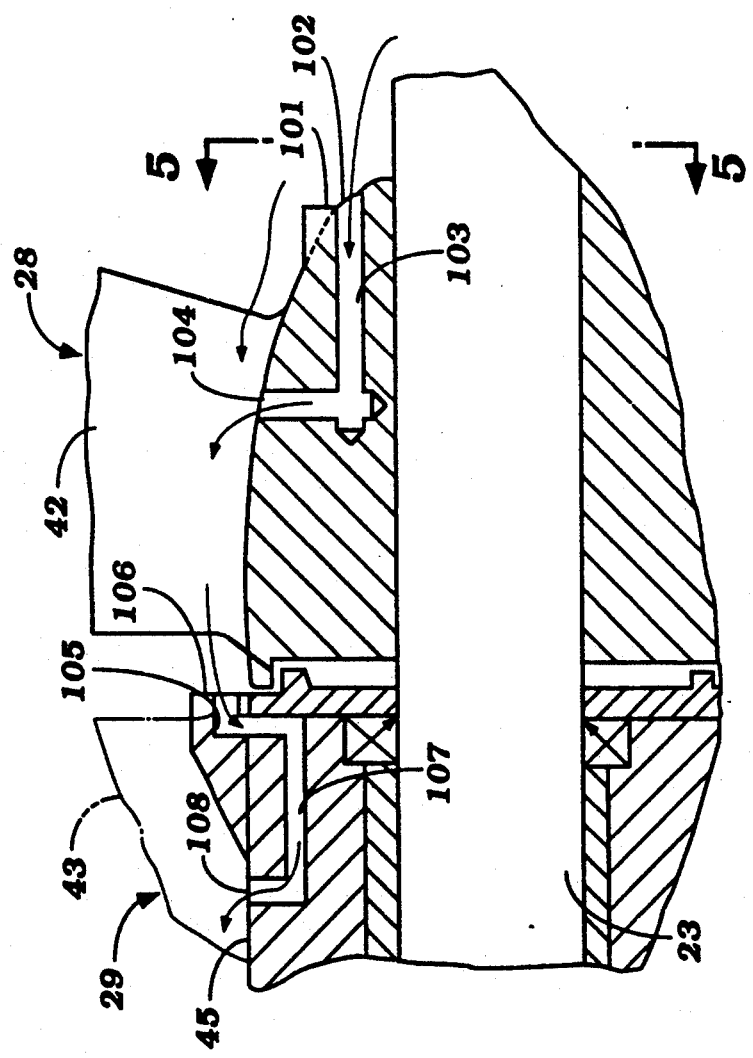
FIG. 4 is a cross sectional view taken through the blade construction of a jet propulsion unit constructed in accordance with another embodiment of the invention.

FIGS. 4 and 5 show another embodiment of the invention. This embodiment, however, rather than employing static pressure generated by the impeller section 28, the device operates by employing dynamic pressure caused by the movement of water through the jet propulsion unit.

Referring specifically to this figure, the components of the impeller 28 and straightening vanes 29 have the same general construction as the previously described embodiment, these components have been identified by the same reference numerals. In this embodiment, the hub 44 of the impeller 28 has a plurality of flattened forwarding facing portions 101 that face the water flow from the inlet opening 14 and in which pressure inlet openings 102 are formed. Water by ram effect will enter the openings 102 and pass through horizontally extending passages 103 which are intersected by vertically extending passages that form outlet openings 104 at the point where the blades 42 join the hub and at the forward or leading edge of the individual vanes 42. As a result of this orientation, high pressure water will always be delivered to the base of the impeller vanes 28 and avoid cavitation.

In a similar manner, the hub 45 of the impeller portion 29 has a flattened forwarding facing surface 105 that extends radially beyond the hub 44 of the impeller 28 and in which an inlet opening 106 is formed. This communicates with a delivery passage 107 formed in the hub 45 of the straightening vanes 29 which terminates in discharge openings 108 formed at the leading edge of the straightening vanes and at a point as aforedescribed in conjunction with the embodiment of FIG. 3. As a result, no cavitation will occur at the base of the straightening vanes 42.

In the foregoing embodiments, each propeller structure is provided with the same type of pressure source, i.e. either static or dynamic. It is to be understood, of course, that any mixture of these arrangements can be employed. Also, the invention need not be limited to propellers that are employed in jet propulsion units as aforenoted. Various other changes in modifications may be made without departing from the spirit and scope of the invention, as defined by the appended claims.

I claim:

1. A blade construction for positioning in a stream of flowing fluid comprising hub having an outer generally cylindrical surface, at least one blade having a base formed at said cylindrical surface of said hub and a blade portion extending outwardly therefrom into the stream of flow, said blade portion having an upstream side and a downstream side, and a passage for delivering a pressurized flow of fluid to said base on the upstream side of said blade along its leading edge for precluding cavitation.

2. A blade construction as set forth in claim 1 wherein the passage is formed at least in part in the hub.

3. A blade construction as set forth in claim 2 wherein the passage has an inlet opening exposed to high pressure fluid.

4. A blade construction as set forth in claim 3 wherein the inlet opening receives high static pressure generated in the system.

5. A blade construction as set forth in claim 3 wherein the inlet opening receives high dynamic pressure resulting from the fluid flow.

6. A blade construction as set forth in claim 2 wherein the blade is a rotating blade.

7. A blade construction as set forth in claim 6 wherein the passage has an inlet opening exposed to high pressure fluid.

8. A blade construction as set forth in claim 7 wherein the inlet opening receives high static pressure generated in the system.

9. A blade construction as set forth in claim 7 wherein the inlet opening receives high dynamic pressure resulting from the fluid flow.

10. A blade construction as set forth in claim 2 wherein the blade is fixed against rotation and functions as a stator.

11. A blade construction as set forth in claim 10 wherein the passage has an inlet opening exposed to high pressure fluid.

12. A blade construction as set forth in claim 11 wherein the inlet opening receives high static pressure generated in the system.

13. A blade construction as set forth in claim 11 wherein the inlet opening receives high dynamic pressure resulting from the fluid flow.

14. A blade construction as set forth in claim 1 wherein the blade is provided within a duct.

15. A blade construction as set forth in claim 14 wherein the means for delivering the pressurized flow of fluid comprises a passage at least in part in the hub.

16. A blade construction as set forth in claim 15 wherein the passage has an inlet opening exposed to high pressure fluid.

17. A blade construction as set forth in claim 16 wherein the inlet opening receives high static pressure generated in the duct.

18. A blade construction as set forth in claim 16 wherein the inlet opening receives high dynamic pressure resulting from the fluid flow through the duct.

19. A blade construction as set forth in claim 14 wherein the blade is a rotating blade for pumping fluid through the duct.

20. A blade construction as set forth in claim 19 wherein the passage has an inlet opening exposed to high pressure fluid.

21. A blade construction as set forth in claim 20 wherein the inlet opening receives high static pressure generated in the system by the rotation of the blade.

22. A blade construction as set forth in claim 20 wherein the inlet opening receives high dynamic pressure resulting from the fluid flow through the duct.

23. A blade construction as set forth in claim 14 wherein the blade is fixed against rotation and functions as a stator.

24. A blade construction as set forth in claim 23 wherein the passage has an inlet opening exposed to high pressure in the duct fluid.

25. A blade construction as set forth in claim 24 wherein the inlet opening receives high static pressure generated in the duct.

26. A blade construction as set forth in claim 24 wherein the inlet opening receives high dynamic pressure resulting from the fluid flow through the duct.

27. A blade construction as set forth in claim 3 wherein the passage inlet opening is formed in an end surface of the hub.

28. A blade construction as set forth in claim 4 wherein the inlet opening is formed in a downstream end surface of the hub.

29. A blade construction as set forth in claim 5 wherein the inlet opening is formed in an upstream end surface of the hub where receiving ram flow.

30. A blade construction as set forth in claim 7 wherein the passage inlet opening is formed in an end surface of the hub.

31. A blade construction as set forth in claim 8 wherein the inlet opening is formed in a downstream end surface of the hub.

32. A blade construction as set forth in claim 9 wherein the inlet opening is formed in an upstream end surface of the hub where receiving ram flow.

33. A blade construction as set forth in claim 11 wherein the passage inlet opening is formed in an end surface of the hub.

34. A blade construction as set forth in claim 12 wherein the inlet opening is formed in a downstream end surface of the hub.

35. A blade construction as set forth in claim 13 wherein the inlet opening is formed in an upstream end surface of the hub where receiving ram flow.

36. A blade construction as set forth in claim 16 wherein the passage inlet opening is formed in an end surface of the hub.

37. A blade construction as set forth in claim 17 wherin the inlet opening is formed in a downstream end surface of the hub.

38. A blade construction as set forth in claim 18 wherein the inlet opening is formed in an upstream end surface of the hub where receiving ram flow.

* * * * *

UNITED STATES PATENT AND TRADEMARK OFFICE
CERTIFICATE OF CORRECTION

PATENT NO. : 5,192,191

DATED : March 9, 1993

INVENTOR(S) : Hiroshi Tasaki

It is certified that error appears in the above-identified patent and that said Letters Patent is hereby corrected as shown below:

Column 4, line 64, Claim 6, "2" should be --1--.

Column 5, line 8, Claim 10, "2" should be --1--.

Signed and Sealed this

Fifteenth Day of February, 1994

Attest:

BRUCE LEHMAN

*Attesting Officer*    *Commissioner of Patents and Trademarks*